Feb. 18, 1947.    M. ZIEGLER    2,416,078
FREQUENCY COUNTER
Filed March 4, 1943    2 Sheets-Sheet 1

MARC ZIEGLER
INVENTOR.

BY

ATTORNEY

Feb. 18, 1947.  M. ZIEGLER  2,416,078
FREQUENCY COUNTER
Filed March 4, 1943                    2 Sheets-Sheet 2

MARC ZIEGLER
INVENTOR.

BY
ATTORNEY

Patented Feb. 18, 1947

2,416,078

UNITED STATES PATENT OFFICE 2,416,078

FREQUENCY COUNTER

Marc Ziegler, Buenos Aires, Argentina, assignor to Hartford National Bank and Trust Company, Hartford, Conn., trustee Application March 4, 1943, Serial No. 477,990

10 Claims. (Cl. 250—36)

1

The present invention relates to frequency counters and frequency meters.

The known frequency counters, as fully explained in the prior U. S. patent application Serial No. 464,380 of Marc Ziegler and M. J. Kobilsky, filed November 3, 1942, Patent No. 2,406,309, dated August 20, 1946, are frequency responsive devices including only resistances and capacities, the output current of which is provided by a number of condenser discharges equal during any time to the number of positive (or negative) pulses of the signal applied to the apparatus. The mean value of the current taken over a sufficiently long time is proportional to the number of pulses and hence to the frequency.

In the aforesaid prior application, a method of frequency stabilization was described involving the use of such known frequency counters. The output obtained from such frequency counters is a current, whereas for the stabilization a voltage proportional to the input frequency is desired. To obtain such a voltage from the known frequency counters, it is necessary to incorporate a resistance in the circuit, and as it is desired to obtain for a given input frequency as large a voltage as possible, or, what amounts to the same thing, as large a voltage variation as possible for the given variation of the input frequency, the tendency is to increase the said resistance as much as possible.

Now, the physical limitation of the known counter arrangements is given by the time needed for the charge or discharge of the condenser, and this in turn depends on the values of the capacity and resistances which have to be incorporated in the circuit. Obviously, this time should be kept low, and as it depends on the product RC, the capacity would have to be reduced to compensate for increases in resistance values. Unfortunately, a limit is soon reached to the possibility of reducing the capacity value, since it must be kept large in comparison with that of the charging and discharging means, e. g. diodes.

For the reasons just set forth, it will be clear that the capacity-resistance frequency counter circuit is not adapted as well as it might be for use in frequency stabilizing arrangements.

I have found, however, that the difficulty can be entirely overcome by utilizing the phenomenon of the tension developed on a self-inductance when a current flowing therethrough is varied by a given amount.

It is, therefore, an object of the present invention to provide a novel method of measuring frequency which consists in varying the current through a self-inductance by a like amount for each half period of like sign of the oscillation the frequency of which has to be measured, and integrating the voltage impulses thus obtained between the terminals of the self-inductance over a time sufficiently large compared with the period of oscillation, the voltage thus obtained being proportional to the frequency of the oscillation.

A further principal object of the present invention is to provide a frequency counter which shall include in its circuit a self-inductance as an operative element to give at the output terminals of the counter a voltage proportional to the frequency of the oscillation to be measured.

These and other objects and advantages of the present invention will become apparent in the course of the following detailed description thereof, in which reference is made to the accompanying drawings.

Figs. 2a–f are graphs illustrating the operation of the counter, and

Figure 3:
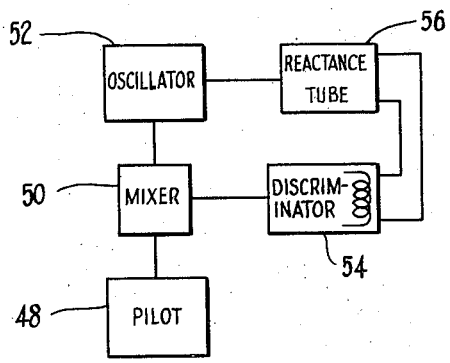

Fig. 3 is a connection diagram of a compensated frequency counter according to the present invention.

Figure 4:
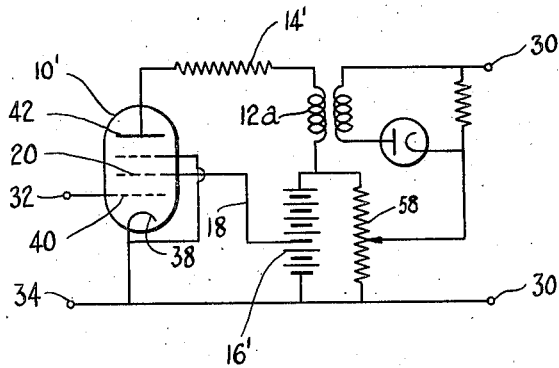
Figure 5:
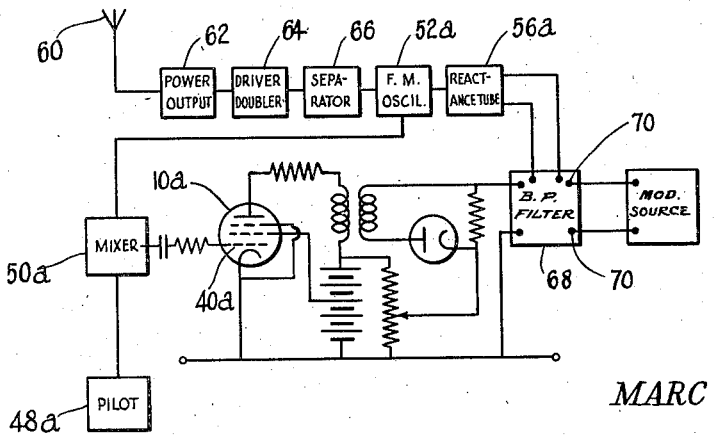

Figs. 4 and 5 are circuit diagrams of a stabilized frequency counter and a frequency modulation transmitter.

Figure 1:
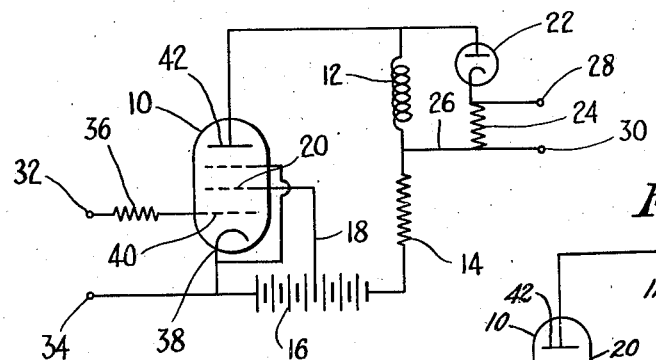
Fig. 1 is a connection diagram illustrating one embodiment of my novel frequency counter.

Referring first to Fig. 1, I provide an amplifier tube, here shown as a pentode 10, the plate circuit of which includes a self-inductance 12 in series with a plate resistance 14 and plate battery 16, from which a tap 18 is taken to the screen grid 20 of the tube 10. The inductance 12 is loaded with a diode 22 in series with a diode resistance 24, the end of which remote from the diode is connected by conductor 26 to a common point of the inductance 12 and the plate resistance 14. The ends of the diode resistance 24 are further connected to output terminals 28 and 30. Input terminals 32, 34 are provided, one of which 32 is connected through a resistance 36 to the grid 40 of the tube 10, and the other of which, 34, is connected to the negative end of the battery 16 to which the cathode 38 is also connected.

The tube 10 is preferably so chosen that for zero tension on the grid 40, to which the signal is applied, the frequency of which is to be measured, a large value of plate current can be obtained for a plate voltage of only a few volts, and a reasonable constant value, say 150 volts, of the screen grid tension. I have found that the tube designated commercially as EL3 is highly satisfactory for this purpose. If the plate 42 of such a tube is connected to a source 16 of high tension of, say 400 volts, by a resistance of for example 10,000 ohms, the current which then will flow in the plate circuit is practically independent of the valve, as it will be nearly equal to the battery voltage divided by the value of the series resistance. With the given values: 400 volts/10,000 ohms=40 ma. Variations of the properties of the tube in time will cause a variation of only a negligible portion of the plate current. Evidently, other tubes having similar properties may also be used.

Figure 2:
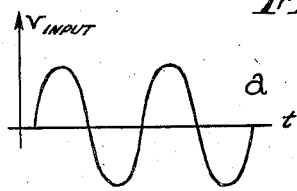
Figure 2:
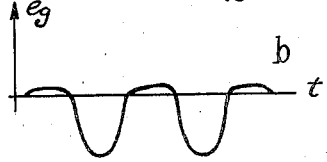
Figure 2:
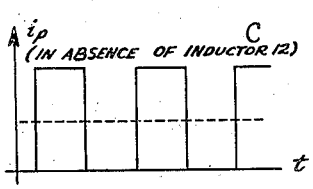
Figure 2:
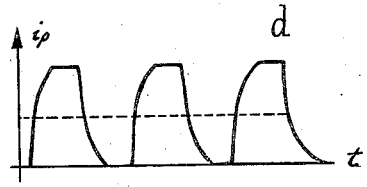
Figure 2:
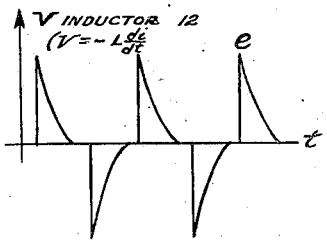
Figure 2:
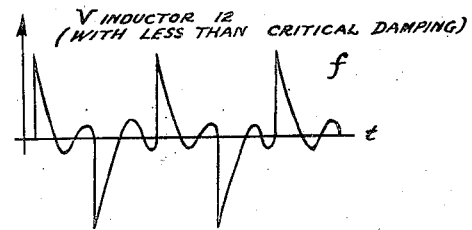

Referring now to Fig. 2, if a large sinusoidal voltage $V_1 \sin 2\pi ft$ is applied to the input terminals 32, 34 of the frequency counter of Fig. 1, the grid voltage, which is limited to a certain extent on the positive side by the grid currents flowing through judiciously selected grid resistances, will have, for appropriate values of coupling capacity, and the like, a shape somewhat like that shown in Fig. 2b, and will swing apparently between a small positive voltage and a negative voltage determined by the tension applied. If there were no inductance coil such as 12, in the plate circuit, but only the plate resistance 14, the plate tension would change periodically and instantaneously from the full battery voltage, when no plate current is flowing, to only a few volts at maximum plate current, and the plate current would swing correspondingly from zero to a substantially constant maximum as shown in Fig. 2c, the average current being practically one-half of said maximum.

The incorporation in the plate circuit of the inductance coil 12 loaded by the diode 22, changes the current curve to that shown in Fig. 2d, so that the maximum current is obtained only after a time sufficiently larger than the value L/R. If the resistance 24 of the diode circuit, which as will be readily understood, takes care of the discharge or unloading of the inductance 12 during the negative half period of the oscillation impressed on the input terminals 32, 34, has the same value as the plate resistance 14, the shape of the current discharge curve will be the same as that of the current loading or charging curve. Hence, as those skilled in the art will readily understand, the voltage developed across the inductance 12 will be of the form shown in Fig. 2e, each voltage impulse corresponding exactly to a value LI given by the expression $\overline{V}\tau = LI$, where LI is the integral of the current over the time $\tau$ which is just equal to the total change in current intensity, independently of the shape of the curve which represents the variation of the instantaneous current with time.

The voltage developed across the resistance 24 in series with the diode is nearly equal to the voltage across the coil 12 during the half period of the oscillation in which the diode current is flowing, as, for voltages impressed on it during the majority of that half period, the internal resistance of the diode is very low compared with the resistance 24.

Consequently the voltage impulses created across the resistance 24 for each half period of one sign (positive in this case) of the oscillation applied, are also given by the above mentioned expression and the mean voltage developed across that resistance 24 over a time which is sufficiently large compared with the period of the frequency considered, will be exactly proportional to the frequency of the oscillation.

In the foregoing discussion, the influence of stray capacities of the coil and connections thereof have not been taken into account. There is some danger, indeed, that oscillations may occur in the LC circuit thus formed, giving, for example, a voltage curve as shown in Fig. 2f, instead of the curve of Fig. 2e, the oscillation of such curve having apparently not finished its normal period of extinction at the commencement of each new period. Such oscillatory phenomena may, however, be readily prevented from taking place by judiciously matching the values of the resistances 14 and 24 to the value of the stray capacity of the coil 12, chosen, so that critical damping is obtained.

As an example of what may be achieved with the present invention, mention may be made of an experimental frequency counter of the novel inductance type, in which the inductance 12 was given a value of 35 mh., the resistance 14 was 14,000 ohms and the voltage of the battery applied to the plate was 400 volts. This arrangement gave a linear response with frequency up to 75 kc. and with a sensitivity of 1 volt/kc. The LC circuit was slightly more than critically damped by the resistances used, and this corresponds to a stray capacity of the coil 12 and its connections of about 45 $\mu\mu f$. The lower limit of voltage for which this arrangement was found to work satisfactory was of the order of 10 volts on the input terminals. From that value up to very large voltages no further change occurred in the output tension. Such a result cannot, by far, be achieved with the same tube if a capacity type counter is used.

My novel frequency counter may readily be compensated and thereby converted into a frequency discriminator suitable for use in stabilization and frequency modulation circuits, for which purpose the output voltage of the counter must be made zero for a predetermined frequency, by opposition of a constant voltage. The frequency for which the output must be zero, must be as constant as possible, as it determines the frequency around which stabilization will be obtained. If the battery tension changes, the current flowing in the inductance will also change and influence the response of the frequency counter. If, however, the compensation voltage varies in the same way, the frequency for zero output will remain unchanged.

Figure 1A:
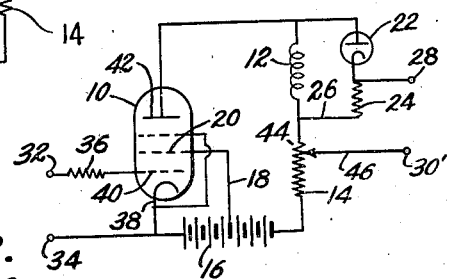
Fig. 1a is a diagram showing a modification of the embodiment of Fig. 1.

These requirements can be met by taking for compensation part of the mean voltage developed across the resistance 14, for instance, by tapping off a portion 44 of said resistance, connecting the tap, as by conductor 46 to an output terminal 30' and suppressing the uncompensated counter output terminal 30 as shown in Fig. 1a. The compensation voltage will then be proportional to the area surface of the current impulses through the resistance 14 and will vary in the same manner with the battery tension and the tube conditions as the voltage across the diode resistance 24.

Another method of compensating is to take, for the compensation, a voltage provided by a potentiometer across the battery terminals.

With such compensations, it can readily be shown that the frequency for zero output depends only on the values of an inductance and one or more resistances, all of which values can easily be kept constant with sufficient accuracy. On the other hand, they can readily be varied when a variation of the stabilizing frequency is desired.

The advantages accruing from the variability of the constants of a compensated frequency counter have been fully set forth for the case of a capacity-resistance type counter in the aforementioned prior U. S. application Serial No. 464,380 and apply equally to the present case.

Briefly, by this means, the frequency of an oscillation having all the constancy of the pilot oscillation used (quartz oscillator) may be varied at will without affecting the said constancy.

Consideration of the circuit shown in Fig. 1 will show that the output is at a high potential with respect to the negative side of the battery, that is to say, generally, with respect to the earth. This circumstance may be avoided by slightly modifying the circuit, as shown in Fig. 4, in which the operative inductance 12a is one side of a 1-to-1 transformer which separates the output circuit from the plate circuit of the tube 10'. In this modification, the compensating voltage is obtained from a potentiometer 58 across the battery 16'. The frequency for zero output is directly proportional to the plate circuit resistance 14' and the potentiometer relation, and inversely proportional to the inductance 12a. Hence said frequency may be adjusted by adjusting the potentiometer relation, and this is a very convenient feature of the apparatus, as indicated above.

The compensated frequency counter or counter type discriminator may be used for frequency stabilization by applying to the input a difference frequency obtained by mixing the oscillation to be stabilized with a pilot oscillation, and feeding back the output of the discriminator to the oscillator which provides the frequency to be stabilized. The circuit arrangement for this purpose is shown in block diagram in Fig. 3, in which 48 is a pilot oscillator, 50 is a mixer to which the outputs of the pilot 48 and of the oscillator 52 which is to be stabilized, are applied. The output of the mixer represents the difference frequency, the amount of which is so chosen that in normal circumstances the oscillator frequency will never pass the pilot frequency, taking into account all possible factors, including frequency modulation. The mixer output is applied to the input of a counter type discriminator according to the present invention, indicated by the rectangle 54 in which an inductance has been drawn to distinguish the type of frequency counter or discriminator utilized. The output of the discriminator 54 is fed back through a reactance tube or equivalent device 56 to the oscillator 52.

Those skilled in the art will readily understand that with an arrangement such as that of Fig. 3, any deviation from the desired frequency due to variation in the constants of the oscillator 52 cannot take place without causing an opposite effect proportional to the frequency change really taking place as a result of both effects, and that therefore stabilization of the oscillator is achieved.

A low pass filter may be included in the output circuit of the discriminator or the counter, to exclude from the output the components of the frequency of the voltage impulses and harmonics thereof, so as to obtain solely a filtered voltage, which may vary proportionally to the variations of the applied frequency.

As illustrated in Fig. 5, the novel counter type discriminator may be applied to frequency modulated transmission. The transmitter antenna 60 is connected through a power output section 62, a driver or doubler 64, and a separator or buffer stage 66 to an oscillator 52a, which is connected to one side of a mixer 50a, the other side of which is joined to a pilot oscillator 48a. The output of the mixer is applied to the control grid 40a of the discriminator tube 10a. The discriminator circuit of Fig. 5 is substantially that of Fig. 4, except that an output band-pass filter indicated by the general reference number 68, is included to exclude from the output of the counter components of the frequency of the voltage impulses applied to the inductance 12a and thereby obtain a filtered voltage which may vary proportionally to the variations of the frequency derived from the mixer 50a. The output of the discriminator after passing through the filter 68 and a modulating voltage impressed on modulating terminals 70 and connected in series with the filtered voltage derived from the band pass filter, are applied to the reactance tube or equivalent device 56a which is connected to the oscillator. The reactance tube therefore acts both as stabilizer and as modulator, and while the discriminator maintains the central frequency constant, the output of the oscillator is also frequency modulated by superimposition of an intelligence factor derived from the terminals 70, and obtained from a suitable source of intelligence, such as a microphone.

In all these embodiments and applications, the full advantage of my novel inductance type frequency counter are retained, so that, as compared with systems utilizing capacity type frequency meters, a considerably greater utility range is achieved.

I claim:

1. A frequency discriminator circuit for counting the frequency of an electrical oscillation, comprising a source of direct current voltage, a pentode tube including an electron-emissive cathode connected to one pole of said source, a control grid connectable to the oscillation to be measured, a plate connected through a self-inductance and a series resistance to the other pole of the source, and a screen grid connected to a point on said source intermediate said poles, the inductance being shunted by a diode having a cathode and a diode resistance in series with the cathode, the end of the diode resistance nearest to the diode cathode being connected to an output terminal, and an intermediate point of the series resistance being connected to a second output terminal.

2. A frequency discriminator the output of which shall be zero at a predetermined frequency attained by an electrical oscillation applied to the discriminator, said discriminator comprising a source of direct current means for impulsively varying said current responsively to said electrical oscillation, a circuit connected to said source and including said current varying means, and a self-inductance and series resistance connected in said circuit, voltage integrating means coupled to said inductance and including an output resistance, a first output terminal connected to one end of the output resistance, an adjustable tap on the series resistance and a second output terminal connected to said adjustable tap, whereby the predetermined frequency for zero output may be adjusted at will.

3. A frequency discriminator the output of which shall be zero at a predetermined frequency attained by an electrical oscillation applied to the discriminator, said discriminator comprising a source of direct current, means for impulsively varying said current responsively to variations in said electrical oscillation, a circuit connected to said source and including said current varying means and a self inductance and series resistance in said circuit, voltage integrating means including a closed circuit inductively coupled to said self-inductance and comprising an output resistance, a potentiometer connected across said source and having an adjustable tap connected to one end of the said output resistance, the other end of the output resistance being connected to a first output terminal and the negative end of the source being connected to a second grounded output terminal, whereby the discriminator may be corrected to give zero output at the predetermined frequency by adjusting the potentiometer tap to compensate for variations of the source.

4. Apparatus for measuring the frequency of an electrical oscillation comprising a source of direct current, a current limiting resistance and an inductance connected in series circuit arrangement, means to interrupt the current in said circuit responsive to the half periods of like sign of said oscillation to produce voltage impulses of substantially constant area and alternate signs across said inductance in synchronism with the half periods of said oscillation, means to selectively derive from said inductance impulses of like sign to produce a direct voltage having an average value substantially proportional to the frequency of said impulses and independent of the amplitude of said oscillation and means to connect a potential proportional to the average current in said series circuit in opposition to said direct voltage to produce an output voltage independent of voltage variations of said source of direct current.

5. Apparatus for measuring the frequency of an electrical oscillation, comprising a source of direct current, a current limiting resistance and an inductance connected in series circuit arrangement, a thermionic tube having a control electrode, and an anode and a cathode connected in said circuit between said inductance and said direct current source, means to apply said oscillation to said control electrode to interrupt the current in said circuit in accordance with the half periods of like sign of said oscillation to produce voltage impulses of substantially constant area and alternate signs across said inductance in synchronism with the half periods of said oscillation, means comprising a closed circuit inductively coupled to said inductance and containing a half wave rectifier connected in series with a load resistance to selectively derive from said inductance the impulses of like sign and to produce across said load resistance a direct voltage having an average value substantially proportional to the frequency of said impulses and independent of the amplitude of said oscillation and means to connect a potential proportional to the average current in said series circuit in opposition to said direct voltage to produce an output voltage independent of voltage variations of said source of direct current.

6. Apparatus according to claim 5, wherein said current-limiting resistance has a resistance value substantially larger than the internal resistance of said thermionic tube and the current in the said series circuit arrangement is substantially independent of variation in the operating condition of the tube.

7. A frequency discriminator having a zero output voltage for a predetermined value of an electrical oscillation applied thereto, comprising a source of direct current, a current limiting resistance and an inductance connected in series circuit relationship, means to interrupt the current in said circuit responsive to the half periods of like sign of said oscillation to produce voltage impulses of alternate signs and having a substantially constant area proportional to the voltage of said source across said inductance in synchronism with the half period of said oscillation, means to selectively derive from said inductance the impulses of like sign to produce a direct voltage having an average value substantially proportional to the frequency of said impulses, and means to connect a voltage proportional to the average current in said series circuit in opposition to said direct voltage to produce an output voltage compensated to zero at a frequency of said oscillation equal to said predetermined value and independent of voltage variations of said source of direct current.

8. A frequency discriminator having a zero output voltage for a predetermined value of an electrical oscillation applied thereto, comprising a source of direct current, a current-limiting resistance and an inductance connected in series circuit relationship, means to interrupt the current in said circuit responsive to the half periods of like sign of said oscillation to produce voltage impulses of alternate signs and having a substantially constant area proportional to the voltage of said source across said inductance in synchronism with the half periods of said oscillation, means to selectively derive from said inductance the impulses of like sign to produce a direct voltage having an average value substantially proportional to the frequency of said impulses and to the voltage of said source, and means to connect a fraction of said source voltage in opposition to said direct voltage to produce an output voltage compensated to zero independently of voltage variations in said direct current source and of the amplitude of said oscillation at a frequency of said oscillation equal to said predetermined value.

9. Apparatus for producing an oscillation having an average frequency stabilized at a predetermined value, comprising a source of oscillations including frequency-adjusting terminals, a pilot oscillator, means to combine oscillations from said source and from said pilot to produce a resulting oscillation, means to produce a control voltage having an amplitude and polarity proportional to variations of the frequency of said resulting oscillation about a predetermined value comprising a source of direct current, a current-limiting resistance and an inductance connected in series circuit relationship, means to interrupt the current in said circuit responsive to the half periods of like sign of said resulting oscillation to produce voltage impulses of alternate signs and having a substantially constant area proportional to the voltage of said source across said inductance in synchronism with the half periods of said resulting oscillation, means to selectively derive from said inductance the impulses of like sign to produce a direct voltage having an average value substantially proportional to the frequency of said impulses, and means to connect a voltage proportional to the average current in said series circuit in opposition to said direct voltage to produce a control voltage compensated to zero at a frequency value of said resulting oscillation equal to the difference between the desired frequency of said source and the frequency of said pilot and independent of voltage variations of said source of direct current, and frequency adjusting means responsive to said control voltage having output terminals connected to the frequency adjusting terminals of the source of oscillations.

10. Apparatus for producing an oscillation having an average frequency stabilized at a predetermined value, comprising a source of oscillations including frequency-adjusting terminals, a pilot oscillator, means to combine oscillations from said source and from said pilot to produce a resulting oscillation, means to produce a control voltage having an amplitude and polarity proportional to variations of the frequency of said resulting oscillation about a predetermined value comprising a source of direct current, a current limiting resistance and an inductance connected in series relationship, means to interrupt the current in said circuit responsive to the half periods of like sign of said resulting oscillation to produce voltage impulses of alternate signs and having a substantially constant area proportional to the voltage of said source across said inductance in synchronism with the half periods of said resulting oscillation, means comprising a closed circuit inductively coupled to said inductance and containing a half wave rectifier connected in series with a load resistance to selectively derive from said inductance the impulses of like sign and to produce across said load resistance a direct voltage having an average value substantially proportional to the frequency of said impulses, means to connect a fraction of said source voltage in opposition to said direct voltage to produce a control voltage compensated to zero at a frequency of said oscillation equal to said predetermined value and independent of voltage variations of said source of direct current, and frequency adjusting means responsive to said control voltage having output terminals connected to the frequency adjusting terminals of the source of oscillations.

MARC ZIEGLER.

REFERENCES CITED

The following references are of record in the file of this patent:

UNITED STATES PATENTS

| Number | Name | Date |
|---|---|---|
| 1,929,259 | Rich | Oct. 3, 1933 |
| 229,919 | Br. to Mallett (1s., 3pp.) | Mar. 5, 1925 |
| 2,279,659 | Crosby | Apr. 14, 1942 |
| 2,121,735 | Foster | June 21, 1938 |
| 1,813,922 | Hansell | July 14, 1931 |
| 1,964,375 | Wright et al. | June 26, 1934 |
| 2,217,220 | Floyd | Oct. 8, 1940 |

FOREIGN PATENTS

| Number | Country | Date |
|---|---|---|
| 546,754 | British | July 29, 1942 |
| 474,771 | British | Nov. 8, 1937 |